United States Patent [19]
Woldenberg et al.

[11] Patent Number: 5,851,118
[45] Date of Patent: Dec. 22, 1998

[54] DIGITAL AND ANALOG TEACHING CLOCK

[75] Inventors: Richard M. Woldenberg, Highland Park, Ill.; Yuen Po Man, Tai Po, Hong Kong

[73] Assignee: Learning Resources, Inc., Vernon Hills, Ill.

[21] Appl. No.: 713,993

[22] Filed: Sep. 13, 1996

[51] Int. Cl.⁶ .................................................. G09B 19/12
[52] U.S. Cl. ........................................................ 434/304
[58] Field of Search ............................................ 434/304

[56] References Cited

U.S. PATENT DOCUMENTS

| 4,015,346 | 4/1977 | Ogasawara | 434/304 |
| 4,102,060 | 7/1978 | Berry | 434/304 |

OTHER PUBLICATIONS

Palyskhool Teachin' Time Talking Clock ©1995.

*Primary Examiner*—Jeffrey A. Smith
*Attorney, Agent, or Firm*—Laff, Whitesel, Conte & Saret, Ltd.

[57] ABSTRACT

A teaching clock comprising an analog clock face having numeric indicia of hour and minute disposed about its periphery, an hour hand and a minute hand pivotally mounted and substantially centrally disposed proximate to the analog clock face, a digital time display disposed adjacent to the analog clock face, and a gear assembly responsive to movement of the minute hand for conforming a time displayed by the digital time display to a time indicated by the hour hand and the minute hand.

18 Claims, 5 Drawing Sheets

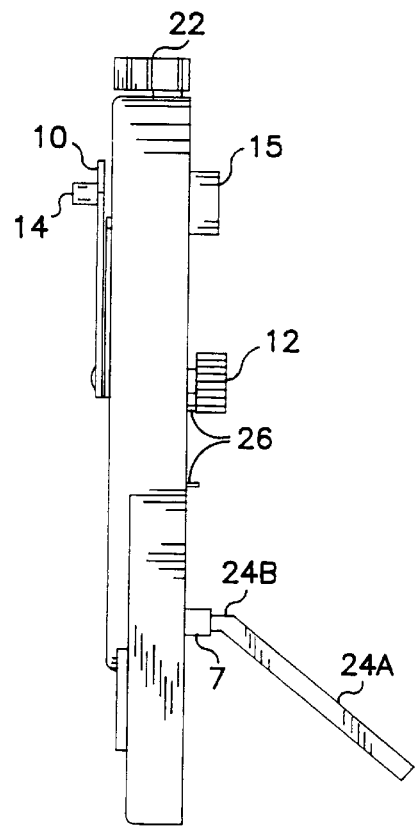
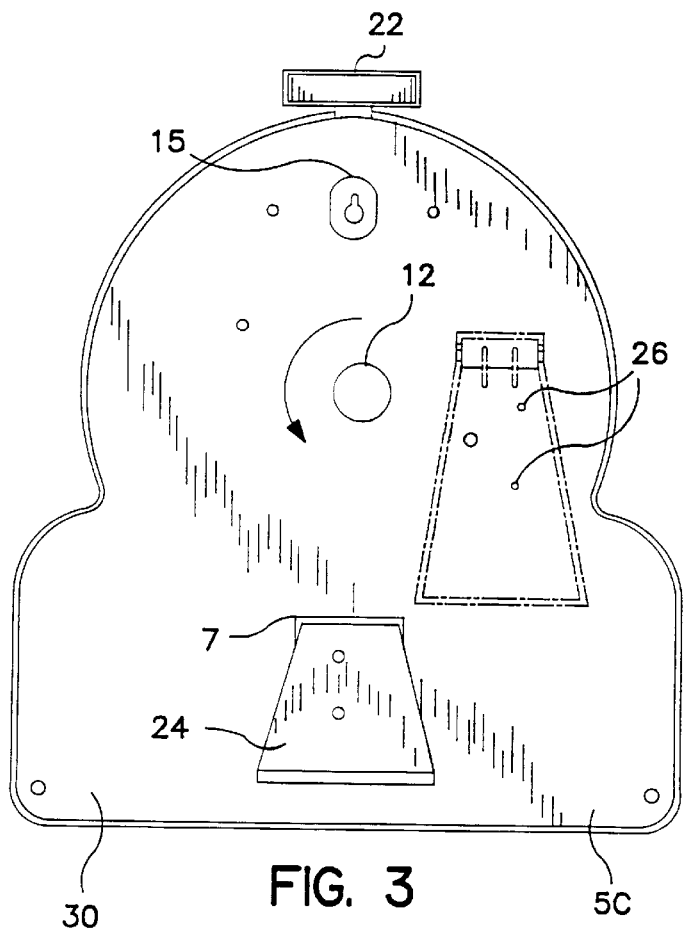
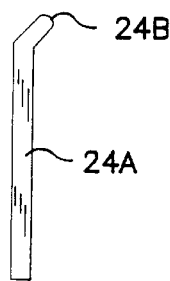
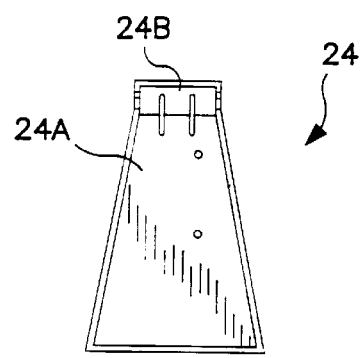

DIGITAL AND ANALOG TEACHING CLOCK

FIELD OF THE INVENTION

The present invention relates to a clock for teaching children how to tell time. More particularly, the present invention relates to a teaching clock that simultaneously displays digital and analog time.

BACKGROUND OF THE INVENTION

Clocks displaying either analog or digital time are used in today's world. Typically, a clock is either analog or digital but not both. Therefore, children must be taught to read time in both formats.

Prior to the development of the present invention, various types of educational games and devices for teaching children how to tell time were known in the prior art. A typical example of an educational device for teaching students how to tell time is disclosed in U.S. Pat. No. 2,539,077, which issued to B. Hawkins on Jan. 23, 1951. In this device, a housing has a clock face with pivotally mounted hands constructed of electrically conducting material which are mounted so as to be insulated from each other. A digital display is also mounted on the housing. An electrical switching network is connected between the clock face and the analog display such that the positioning of the clock hands in correlation with the time indicated on the digital display will complete an electrical circuit and activate an electrical signaling device.

Another educational time teaching device is disclosed in U.S. Pat. No. 4,331,427, which issued to D. Dotson on May 25, 1982. In this device, a minute dial has a plurality of coins mounted in a circle, the coins defining a minute scale based upon the value of the coins. A second, hour dial can be detachably mounted on the minute dial in aligned superposed relationship with the periphery of the minute scale. A detachable rotatable hand is usable either with the minute hand alone, or with the two superimposed dials. In use, a student is first taught to read the minute hand by demonstration, then the second hour dial is mounted for teaching the student to read the hour hand of an analog clock.

While the above-mentioned devices are suitable for their intended purposes, the devices are not well suited to teaching a child in a classroom setting how to understand and recognize the equivalence of digital and analog representations of the same time. In addition, other devices require electrical power to operate and do not allow a teacher to easily change the displayed time for instructional purposes.

Further, these devices are poorly suited for contemporaneously instructing a classroom full of students. Digital time should be displayed in characters large enough to be read by all members of an audience or class, but providing digital time in large characters should not make the teaching clock so large or bulky that it becomes clumsy to hold. Teaching clocks should also be designed to be extremely durable to withstand the abuse inherent in classroom use. Clock hand mechanisms should be able to work equally well forward and backward, as abuse of clock hands may be anticipated. In the modern classroom, children learn primarily from "hands on" experience, and can be expected to handle a classroom clock more now than in past generations.

Classroom clocks should be able to accommodate the teaching plans and patterns of different school systems. Some schools favor whole class teaching (one to many), while others may emphasize more individual teaching (one to few). Some classrooms will leave clocks hanging on the wall, while others will leave them as a classroom device for the use of all, standing on a table in the classroom. A need arises for suitable classroom clocks satisfying all of these requirements.

It is thus apparent that there is a need for an improved teaching clock for instructing children how to tell time, particularly in a classroom setting, and that is capable of simultaneously displaying digital and analog time.

SUMMARY OF THE INVENTION

These and other needs are satisfied by the teaching clock of the present invention, which comprises an analog clock face having numeric indicia of hour and minute disposed about its periphery, an hour hand and a minute hand pivotally mounted and substantially centrally disposed proximate to the analog clock face, a digital time display disposed adjacent the analog clock face, wherein the digital time display includes first and second disk-shaped, digital time indicating elements, each having an axis of rotation substantially perpendicular to the analog clock face, and means responsive to movement of the minute hand for conforming a time displayed by the digital time display to a time indicated by the hour hand and the minute hand.

The digital time display comprises a numeric hour display and an adjacent numeric minute display. The numeric minute display includes means operatively coupled to the numeric hour display for updating the numeric hour display at sixty minute intervals. Both the numeric hour display and said numeric minute display may comprise numeric time indicia affixed to rotatably mounted gear means, with the numeric time indicia visible through adjacent hour and minute apertures. The apertures may include slidable cover means for selectively covering the numeric hour and minute displays. The means responsive to movement of the minute hand may comprise one or more actuating gears in communication with the minute hand and with the digital display.

The teaching clock comprises a face, an hour hand pivotally mounted over the face and manually rotatable through a 360° arc, a minute hand pivotally mounted over the face and manually rotatable through a 360° arc, time indicia on the face, and digital means visible on the face for synchronously displaying the time depicted by the minute hand, the hour hand, and the time indicia on the face of the teaching clock, wherein the digital means includes first and second disk-shaped, digital time indicating means, each of the digital time indicating means having an axis of rotation substantially perpendicular to the face.

The digital means further comprises a digital hour indicator on the clock face which displays an hour representation corresponding to the hour indicated by the hour hand and the time indicia, and a digital minute indicator which displays a minute representation corresponding to minutes indicated by the minute hand and the time indicia, the digital minute indicator also mounted on the face and operatively connected to the digital hour indicator.

The clock may further include a first sliding door manually closeable over the digital hour indicator, and a second sliding door manually closeable over the digital minute indicator, such that the first sliding door and the second sliding door selectively cover the digital hour indicator and the digital minute indicator.

A time incrementing knob may be provided, engaging the hour and minute hands, the time incrementing knob manually rotating the minute hand and the hour hand. The teaching clock also includes a housing to which the face is applied, a stand engageable with the housing, and a handle retractably accommodated by the housing. The time indicia and the digital means may display the time in a twelve-hour format or a twenty-four-hour format.

Further objects, features, and advantages of the present invention will become apparent from the following description and drawings.

BRIEF DESCRIPTION OF THE DRAWINGS

FIG. 3 is a rear elevational view of the teaching clock of FIG. 1;

FIG. 4 is a right side elevational view of the teaching clock of FIG. 1;

FIGS. 5 and 6 are elevational views of a clock stand suitable for use with the teaching clock of the present invention;

DETAILED DESCRIPTION OF THE INVENTION

Figure 1:
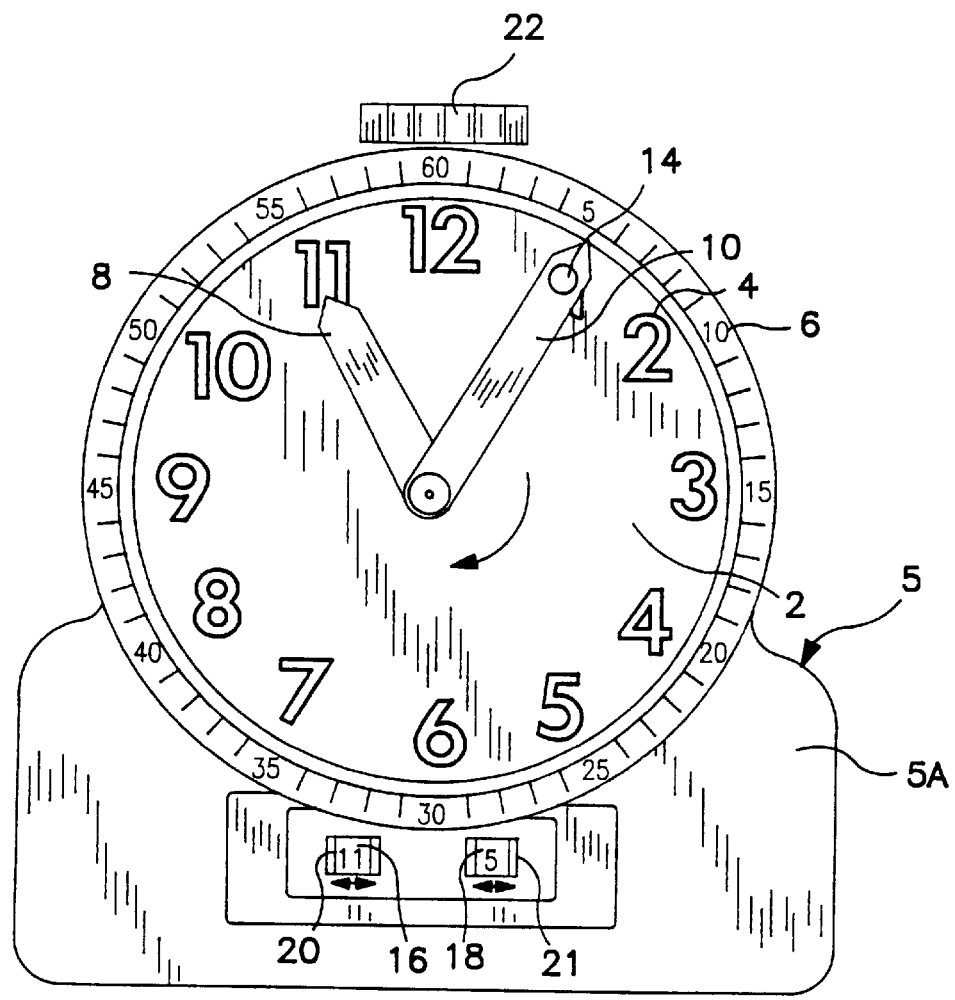
FIG. 1 is a front elevational view of a teaching clock in accordance with the present invention.
Figure 2:
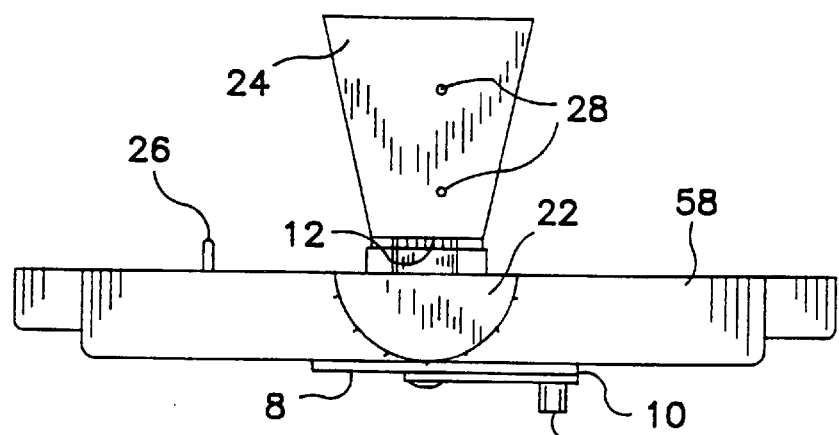
FIG. 2 is a top plan view of the teaching clock of FIG. 1.

In accordance with the present invention, a digital and analog teaching clock is described that provides distinct advantages when compared to those of the prior art. The invention can best be understood with reference to the accompanying drawing figures.

As shown in FIGS. 1–4, the teaching clock includes an outer housing 5, the frontal portion 5A of which comprises a face 2 preferably painted on the frontal portion 5A. Analog time indicia 4, 6 corresponding to hours and minutes, respectively, are incrementally depicted along the perimeter of the face 2 of the clock.

An hour hand 8 and a minute hand 10 are pivotally coupled to the face 2 and are manually rotatable through a 360° arc via a time incrementing knob 12 located on the back side of the clock (FIG. 3) at the pivotal intersection of the hour hand 8 and the minute hand 10. Alternatively, the hour hand 8 and the minute hand 10 can be advanced by utilizing a knob 14 on the minute hand 10. The time incrementing knob 12 permits an instructor to adjust the time without obstructing the students' view of the clock face 2.

The teaching clock also includes two windows through which a digital hour indicator 16 and a digital minute indicator 18 are visible. In order to facilitate learning and avoid confusion, sliding doors 20, 21 may be utilized to cover one or both the digital hour indicator 16 and the digital minute indicator 18, respectively. These sliding doors are not spring-loaded, nor are they momentarily activated by a separate control on the teaching clock. Consequently, they remain in the position in which the operator has placed them.

The sliding doors 20, 21 allow a teacher to concentrate solely on analog time, if desired, and are also useful for validation, whether the teaching clock is used for teaching a group or by a student alone. A student may simply open the sliding doors 20, 21 to verify whether he has positioned the hands properly for a particular time, then close the doors 20, 22 until it is time to verify the next lesson.

In one embodiment, which can be used to teach children how to tell 24-hour time, the numbers on the digital hour indicator 16 range from one to twenty-four. In another embodiment, which can be used to teach children how to tell 12-hour time, the numbers on the digital hour indicator 16 range from one to twelve. It should be noted that the same digital hour indicator 16 can be used for both 12-hour and 24-hour time. For 12-hour time, hours 1 through 12 are simply screened in order twice on the digital hour indicator 16.

As best seen in FIGS. 2–6, the clock is also provided with a stand 24 for supporting the clock in a suitable position for viewing by students. To prop the clock in a generally vertical position, the stand 24 is secured to the housing 5 of the clock via a groove 7 formed in the back 5C of housing 5. The stand includes a major leg 24A and a minor leg 24B which is integrally joined but angled relative to the major leg 24A.

The stand 24 can be manually removed from the groove 7 and stored on prongs 26 projecting from the outer housing 5 by positioning the stand 24 so that openings 28 in the stand 24 are aligned with the prongs 26, and then applying gentle pressure. The outer housing 5 of the teaching clock further includes a rear cover plate 30.

A boss 15 having a keyhole-shaped opening is also provided on the rear cover plate 30. This boss 15 is used to hang the teaching clock from a vertical surface, such as a wall.

The clock also includes a collapsible handle 22 (FIGS. 1, 3, 7) that can be used to facilitate positioning and transporting of the teaching clock. The collapsible handle 22 includes a top portion 22A coupled to an elongated U-shaped member 22B which is connected to a bottom portion 22C. The top portion 22A is semi-circular in shape and extends through an aperture 25 in the top 5B of the outer housing 5.

The elongated U-shaped member 22B rests on a channel support 23 which is formed at the top portion 5B of the outer housing 5, and is confined in its vertical orientation by walls (not shown) formed on the interior of the rear cover plate 30. The bottom portion 22C of the collapsible handle 22 is larger than the aperture 25, and thus prevents the collapsible handle from being inadvertently pulled out of the outer housing.

Figure 7:
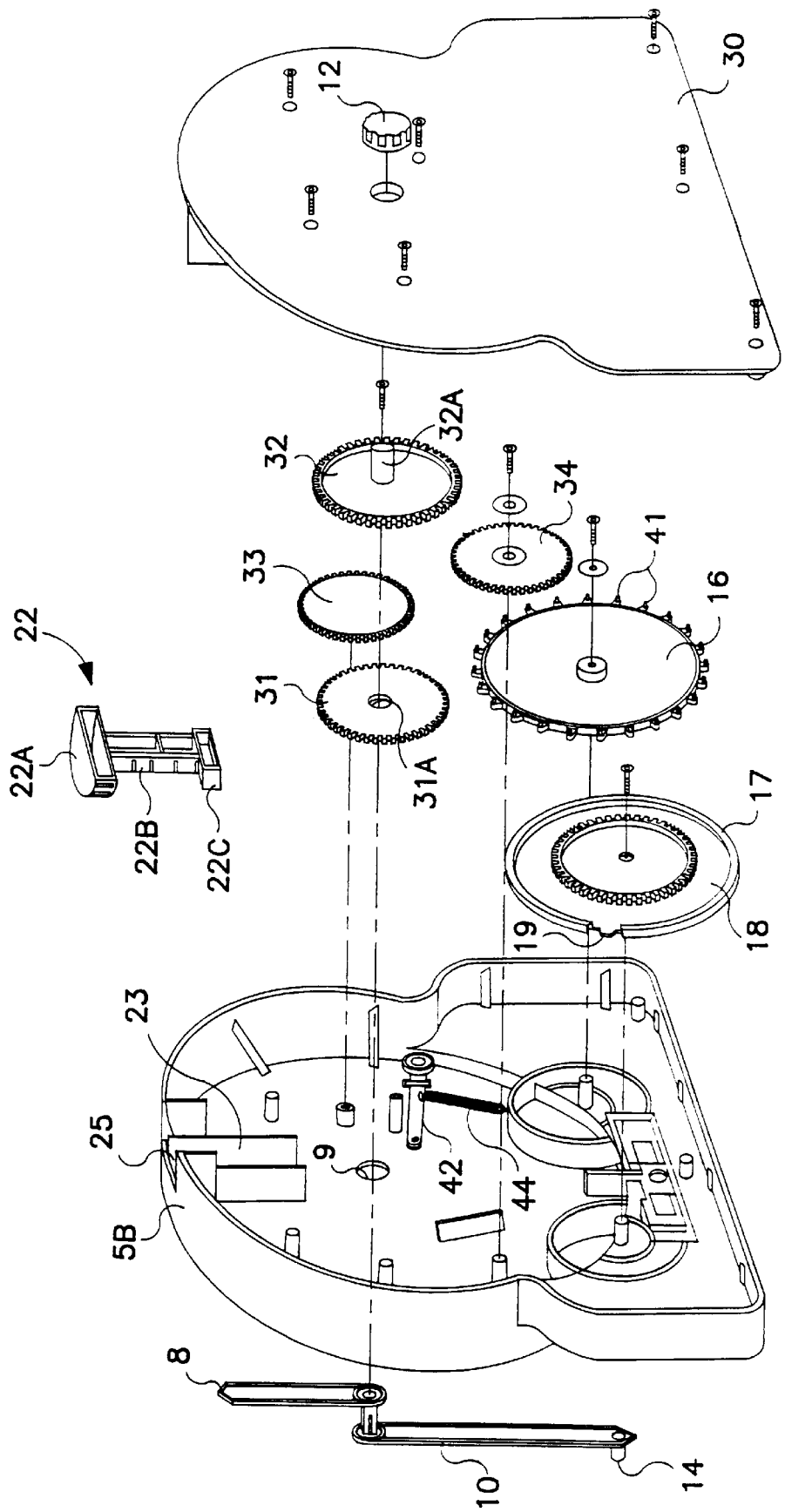
FIG. 7 is an exploded view in perspective of the teaching clock of FIG. 1.
Figure 8:
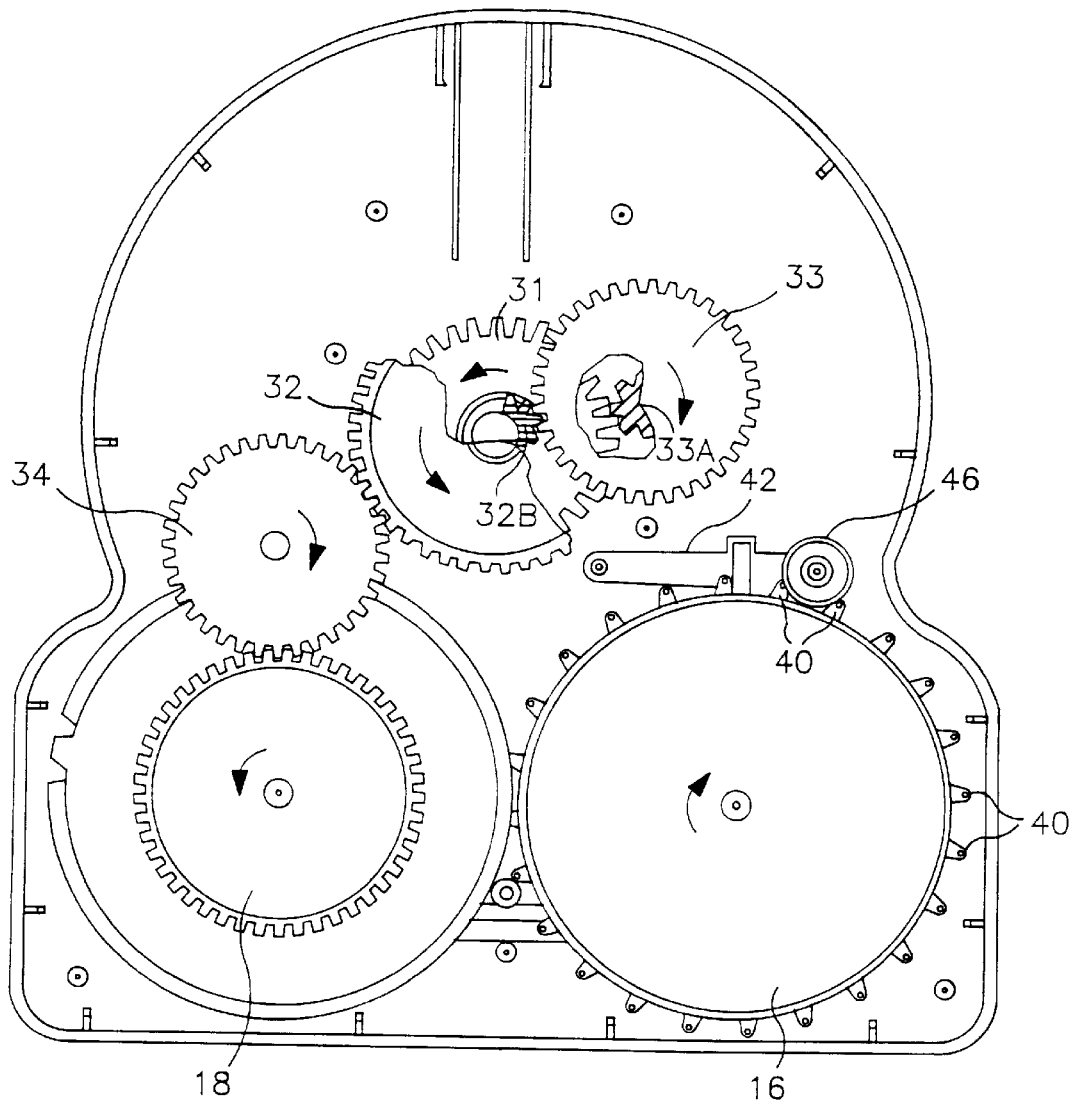
FIG. 8 is a partial cutaway view of the teaching clock of FIG. 1, shown from the rear.
Figure 9:
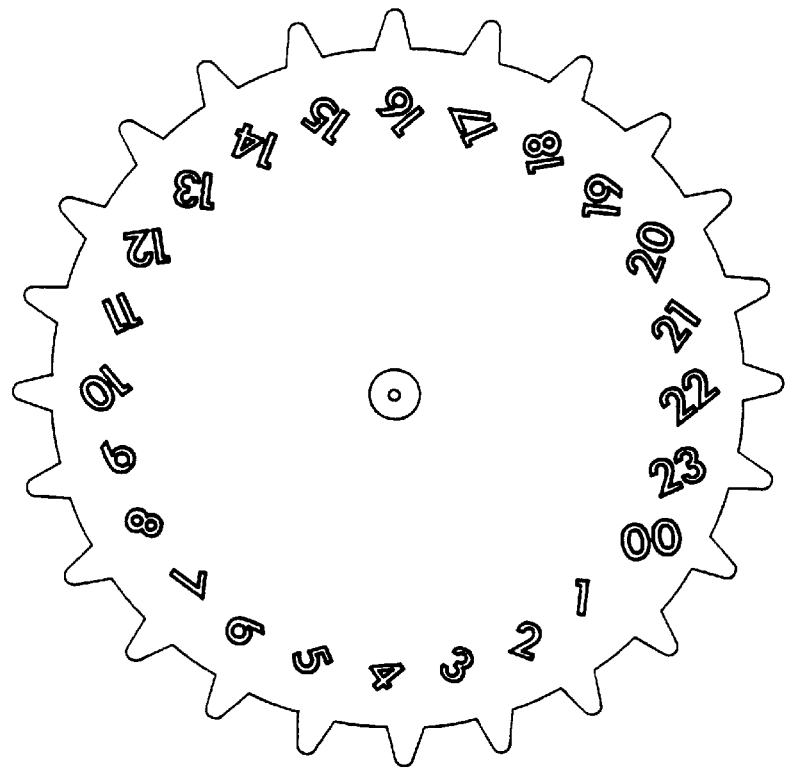
FIGS. 9 and 10 are enlarged front elevational views of the digital hour and minute indicators, respectively.
Figure 10:
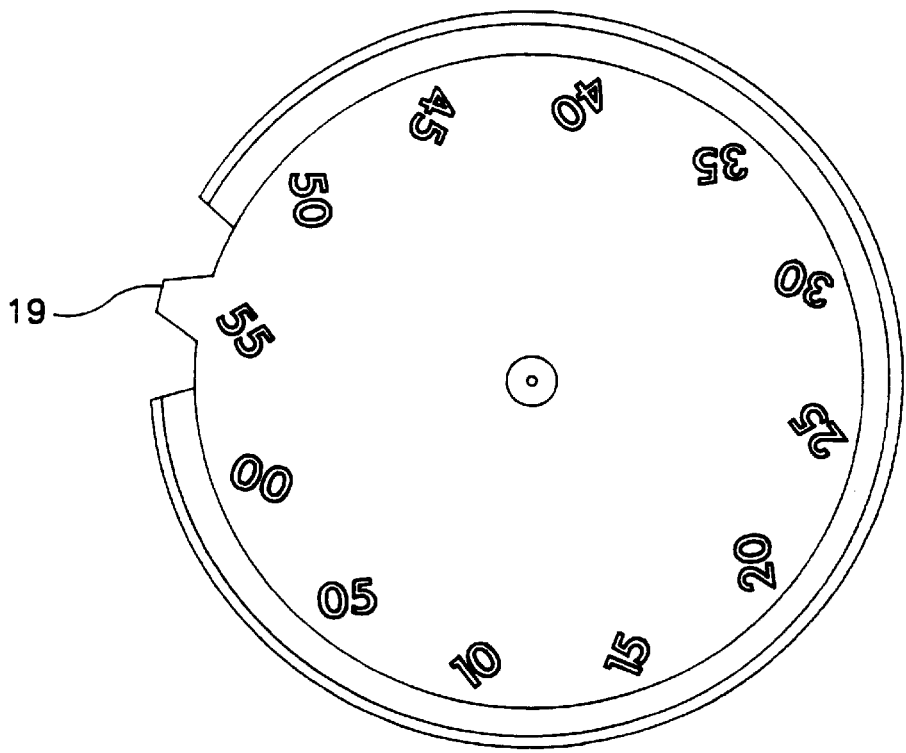

The inter-relationship and cooperation of the various gears that comprise the gear assembly are best seen in FIGS. 7 and 8. Although FIG. 7 includes a view of the rear cover plate 30, several details, such as the groove 7 and the boss 15, are omitted for the sake of clarity. All of the gears are mounted in the interior of the frontal portion 5A of the housing 5 for ease and reliability of assembly.

The gear assembly includes four gear members, namely: a first gear member 31, a second gear member 32, a third gear member 33, and a fourth gear member 34. A central portion 31A of the first gear member 31 extends through an aperture 9 in the face 2 of the clock and is operatively coupled to the hour hand 8, while the second gear member 32 is operatively coupled to the minute hand 10. The first gear member 31 has a diameter of approximately three inches and includes teeth along its circumference.

The second gear member 32 has a central portion 32A which extends through the central portion 31A of the first gear member 31 where it couples to the minute hand 10, and this central portion 32A also extends toward the rear cover plate 30 where it couples to the time incrementing knob 12. The second gear member 32 is approximately three and a half inches in diameter and includes a small pinion gear 32B, coaxially aligned with and integrally formed with second gear member 32, and approximately one inch in diameter.

Central portions 31A and 32A lock into the hands, assuring alignment of digital and analog time, and movement of the hands in appropriate clockwise lockstep. Central portion 32A is attached to the minute hand 10 with a screw, which actually holds both the minute hand 10 and the hour hand 8 in position.

The third gear member 33 is approximately three inches in diameter and operatively engages the small gear 32B of the second gear member. The third gear member 33 also includes a small pinion gear 33A, coaxially aligned with and integrally formed with third gear member 33, and which engages the teeth of the first gear member 31. The fourth gear member 34 is approximately three inches in diameter and is operatively coupled to the second gear member 32 as well as the digital minute indicator 18. A tab 19 in the digital minute indicator 18 engages one of the teeth 40 along the circumference of the digital hour indicator 16. Thus, as a user manually rotates the time incrementing knob 12, or advances the minute hand using the knob 14, the gear assembly advances the following elements when appropriate: the hour hand 8, the minute hand 10, the digital hour indicator 16, and the digital minute indicator 18.

The teaching clock of the present invention is also fully operational in both directions. If an instructor wishes to change the time display from "11:00" to "10:45," for example, the minute hand may be moved in reverse to this new time position, instead of nearly twelve hours in a forward direction, as some clocks require.

It should be noted that the digital hour indicator 16 is held in position by an arm 42 that is biased by a spring 44 such that a roller 46 at one end of the arm 42 rests between successive teeth 40 of the digital hour indicator 16. As can be appreciated particularly from an examination of FIG. 7, each of the teeth 40 of the digital hour indicator 16 includes a post 41. A circumferential rim 17 that substantially surrounds the digital minute indicator 18 is designed to capture a single post 41 after the tab 19 engages the appropriate tooth 40 of the digital hour indicator 16. Since posts 41 adjacent to the post that is captured are outside the circumferential rim 17, the digital hour indicator 16 is precluded from rotating until the tab 19 interacts with the next tooth 40 as the digital minute indicator 18 approaches the "00" indication.

Because the advance of the digital hour indicator 16 is effected by the tab 19 on the digital minute indicator 18, and because the roller 46 as described above tends to eliminate casual motion of the digital hour indicator 16, the digital hour indication changes precisely on the hour, and is always properly aligned with respect to the digital display window.

There has been described herein a digital and analog teaching clock that is relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A teaching clock comprising:
    an analog clock face having numeric indicia of hour and minute disposed about its periphery;
    an hour hand and a minute hand pivotally mounted and substantially centrally disposed proximate to the analog clock face;
    a digital time display disposed adjacent to said analog clock face, wherein said digital time display includes a disk-shaped, digital minute indicator having a numeric minute display and a disk-shaped, digital hour indicator having a numeric hour display, each of said digital indicators having an axis of rotation substantially perpendicular to said analog clock face; and
    means responsive to movement of said minute hand for conforming a time displayed by said digital time display to a time indicated by said hour hand and said minute hand.

2. The teaching clock of claim 1, wherein said digital minute indicator includes a projection, and said numeric hour display includes a plurality of teeth sized and spaced to engage said projection over a predetermined segment of arc of rotation of said digital minute indicator for updating said numeric hour display each time said projection moves through said predetermined arc.

3. The teaching clock of claim 2, wherein said digital minute indicator further comprises a rim extending substantially around the circumference of said disk and exposing said projection, and wherein each of said teeth on the digital hour indicator further comprises a post, so that after said projection engages a tooth of the digital hour indicator to update said numeric hour display, said rim captures only that post which is on the tooth next in position to engage said projection, the adjacent posts being outside said rim, precluding the digital hour indicator from rotating until the projection engages another tooth on said digital hour indicator.

4. The teaching clock of claim 1, wherein said numeric hour display and said numeric minute display comprise numeric time indicia affixed to rotatably mounted gear means, said numeric time indicia visible through adjacent hour and minute apertures in said analog clock face.

5. The teaching clock of claim 4, wherein said apertures include slidable cover means for selectively covering said numeric hour and minute displays.

6. The teaching clock of claim 1, wherein said means responsive to movement of said minute hand comprises one or more actuating gears in communication with said minute hand and with said digital display.

7. A teaching clock for instructing students how to tell time comprising:
    a) a face;
    b) an hour hand pivotally mounted over said face and manually rotatable through 360°;
    c) a minute hand pivotally mounted over said face and manually rotatable through 360°;
    d) time indicia on the face; and
    e) digital means visible on said face for synchronously displaying the time depicted by the minute hand, the hour hand, and the time indicia on the face of the teaching clock; wherein said digital means includes a disk-shaped digital hour indicator which displays an hour representation corresponding to the hour indicated by the hour hand and the time indicia, and a disk-shaped, digital minute indicator which displays a minute representation corresponding to the minutes indicated by the minute hand and the time indicia, said digital indicators each having an axis of rotation substantially perpendicular to said face.

8. The teaching clock of claim 7 which further comprises a projection behind the face which rotates through 360° once with each revolution of the digital minute indicator, said projection engaging and incrementally updating the digital hour indicator during a predetermined portion of said 360° rotation.

9. The teaching clock of claim 7 further comprising:
a) a first sliding door manually closeable over the digital hour indicator; and
b) a second sliding door manually closeable over the digital minute indicator, such that the first sliding door and the second sliding door selectively cover the digital hour indicator and the digital minute indicator.

10. The teaching clock of claim 7, further comprising a time incrementing knob engaging said hour and minute hands, said time incrementing knob manually rotating the minute hand and the hour hand.

11. The teaching clock of claim 7, further comprising a housing and wherein said face is applied to said housing.

12. The teaching clock of claim 11 further comprising a stand reversibly securable to a groove in the housing to support the clock.

13. The teaching clock of claim 12, further comprising a handle retractably accommodated by the housing.

14. The teaching clock of claim 7, wherein the time indicia and the digital means display the time in a twelve-hour format.

15. The teaching clock of claim 7, wherein the time indicia and the digital means display the time in a twenty-four-hour format.

16. A teaching clock for instructing students how to tell time comprising:
a) a housing having a front side;
b) a face applied to the front side of said housing
c) an hour hand pivotally mounted over said face and manually rotatable through 360°;
d) a minute hand pivotally mounted over said face and manually rotatable through 360°;
e) time indicia on the face;
f) a digital hour indicator which displays an hour representation corresponding to the hour indicated by the hour hand and the time indicia, said digital hour indicator visible on said face;
g) a digital minute indicator which displays a minute representation corresponding to the minutes indicated by the minute hand and the time indicia, said digital minute indicator visible on said face and operatively connected to said digital hour indicator;
h) a time incrementing knob behind the face;
i) a gear assembly for synchronously advancing the hour hand, the minute hand, the digital hour indicator, and the digital minute indicator, the gear assembly including: a first gear member operatively coupled to the hour hand, a second gear member having a central portion extending therethrough, with one end of the central portion of said second gear member coupled to the minute hand and the other end of said central portion of said second gear member coupled to said time incrementing knob, the second gear member being operatively connected to the first gear member, a third gear member operatively connected to the second gear member and the first gear member, and a fourth gear member operatively coupled to the second gear member and the digital minute indicator;

wherein the time incrementing knob engages said hour and minute hands for manually rotating the minute hand and the hour hand, and for synchronously advancing the digital indicators through said gear assembly.

17. The teaching clock of claim 16, wherein the time indicia and the digital indicators display the time in a twelve-hour format.

18. The teaching clock of claim 16, wherein the time indicia and the digital indicators display the time in a twenty-four-hour format.

* * * * *